United States Patent
Jung

(10) Patent No.: US 9,398,567 B2
(45) Date of Patent: Jul. 19, 2016

(54) COMMUNICATION METHOD AND APPARATUS FOR JOINTLY TRANSMITTING AND RECEIVING SIGNAL IN MOBILE COMMUNICATION SYSTEM

(71) Applicant: Samsung Electronics Co., Ltd., Gyeonggi-do (KR)

(72) Inventor: Jung-Soo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 13/894,265

(22) Filed: May 14, 2013

(65) Prior Publication Data

US 2013/0301455 A1    Nov. 14, 2013

(30) Foreign Application Priority Data

May 14, 2012    (KR) .................. 10-2012-0050939

(51) Int. Cl.
| | | |
|---|---|---|
| *H04L 1/00* | (2006.01) | |
| *H04W 72/04* | (2009.01) | |
| *H04W 48/20* | (2009.01) | |
| *H04L 5/00* | (2006.01) | |

(52) U.S. Cl.
CPC ............. *H04W 72/0406* (2013.01); *H04L 5/00* (2013.01); *H04W 48/20* (2013.01); *H04W 72/042* (2013.01)

(58) Field of Classification Search
CPC ..... H04W 80/04; H04W 80/05; H04W 80/06; H04W 80/07; H04W 80/08
USPC .................. 370/252, 328–334; 455/436–439, 455/442–444, 509
See application file for complete search history.

(56) References Cited

U.S. PATENT DOCUMENTS

| | | |
|---|---|---|
| 2002/0034943 A1 | 3/2002 | Pallonen |
| 2005/0037799 A1 | 2/2005 | Braun et al. |
| 2008/0132262 A1 | 6/2008 | Jung et al. |
| 2011/0171955 A1 | 7/2011 | Acharya |
| 2011/0211487 A1 | 9/2011 | Han et al. |
| 2012/0076038 A1* | 3/2012 | Shan et al. ..................... 370/252 |

OTHER PUBLICATIONS

International Search Report issued on Aug. 27, 2013 in connection with International Application No. PCT/KR2013/04270, 3 pages.
Written Opinion of the International Searching Authority on Aug. 27, 2013 in connection with International Application No. PCT/KR2013/004270, 7 pages.
Extended European Search Report issued for EP 13791308.3 dated Jan. 20, 2016, 11 pgs.
Motorola, "Coordinated Beamforming Algorithms Based on Spatial Covariance Feedback and its Gain Over Single-Point SU/MU Beamforming", R1-093410, 3GPP TSG RAN1 #58, Aug. 19, 2009, 10 pgs.

* cited by examiner

*Primary Examiner* — Dady Chery

(57) ABSTRACT

A communication method is performed by a Mobile Station (MS) in a mobile communication system including a plurality of Base Stations (BSs). The method includes receiving at least one reference signal through at least one receive beam in a direction of nearby BSs, determining at least one candidate BS for joint transmission/reception among the nearby BSs based on the received at least one reference signal, and transmitting information about the determined at least one candidate BS to a serving BS.

26 Claims, 14 Drawing Sheets

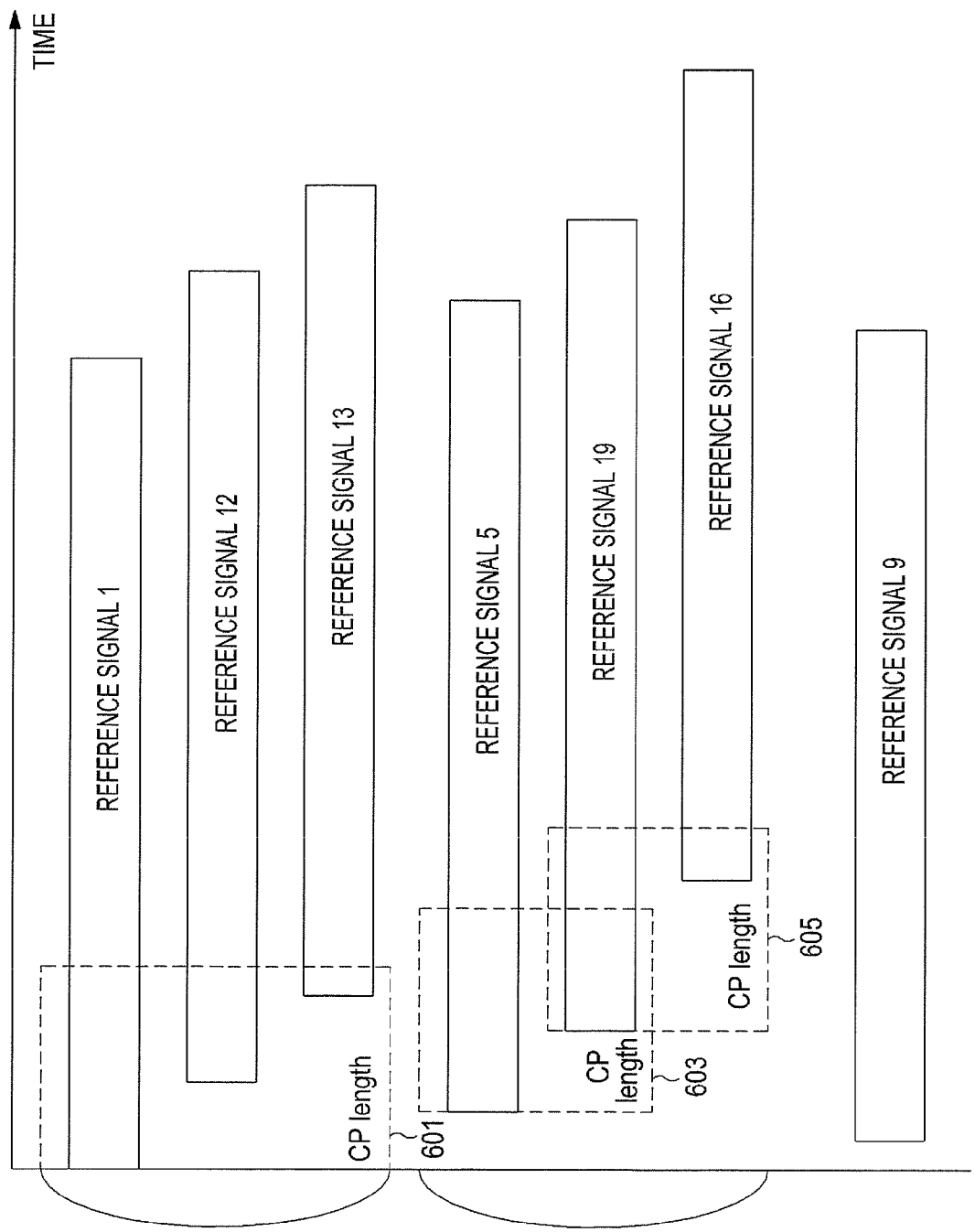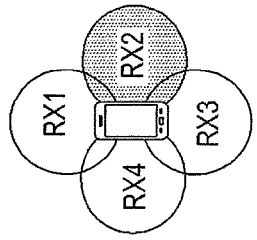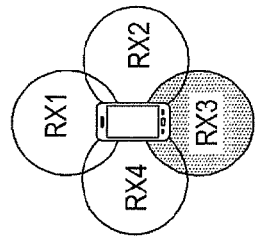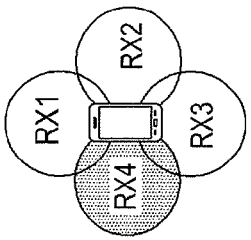
FIG.6A  FIG.6B  FIG.6C

COMMUNICATION METHOD AND APPARATUS FOR JOINTLY TRANSMITTING AND RECEIVING SIGNAL IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on May 14, 2012 and assigned Serial No. 10-2012-0050939, the entire disclosure of which is incorporated herein by reference.

TECHNICAL FIELD OF THE INVENTION

The present disclosure relates generally to a method and apparatus capable of stably maintaining a communication link in a mobile communication system, and more particularly, to a method and apparatus for transmitting and receiving signals by a plurality of Base Stations (BSs) in a mobile communication system.

BACKGROUND OF THE INVENTION

Due to the increasing popularity of terminals or Mobile Stations (MSs) such as smart phones, the average amount of data consumed by mobile users has exponentially increased, and the users' demands for higher data rates have also constantly increased.

Generally, a method for providing a high data rate in a mobile communication system may be divided into a method of using a wider frequency band to provide communication, and a method of increasing the frequency use efficiency. It is very difficult to provide a higher average data rate with the latter method, because the communication technologies of the current generation already support the frequency use efficiency close to its theoretical limit, making it difficult to further increase the frequency use efficiency by improving the technologies.

Therefore, a more feasible way to increase the data rate is to provide data services over a wider frequency band. In this case, available frequency bands need to be considered. In the current frequency distribution policy, available broadband communication bands of 1 GHz or more are limited, and the available frequency bands include only the millimeter wave (mmW) bands of 30 GHz or more. In these high frequency bands, unlike in the 2 GHz band used by the conventional cellular systems, signals are significantly attenuated depending on the distance. Due to the signal attenuation, in the case of a BS that uses the same power as that of the conventional cellular system, its coverage may be significantly decreased. In order to solve these and other problems and disadvantages, beamforming techniques are widely used to increase the transmission/reception efficiency of an antenna by concentrating transmit/receive power in a narrow space.

FIG. 1 illustrates a mobile communication system including a MS and a BS that provides beamforming using array antennas.

Referring to FIG. 1, a BS 110 may transmit data in each of cells (or sectors) 101, 103 and 105 using a plurality of array antennas Array0 and Array1 by switching the direction of a Downlink (DL) Transmit (Tx) beam 111. A MS 130 may also receive the data by switching the direction of a Receive (Rx) beam 131.

In the mobile communication system that performs communication using the beamforming technique, the BS 110 and the MS 130 provide data services by selecting the direction of a Tx beam and the direction of a Rx beam, which show the optimal channel environment, from among a variety of directions of the Tx beam and the Rx beam. The beamforming technique may be equally applied not only to a DL channel carrying data from the BS 110 to the MS 130, but also to an Uplink (UL) channel carrying data from the MS 130 to the BS 110.

In the beamforming technique, if it is assumed that the number of directions of a Tx beam, in which the BS 110 can transmit data, is N, and the number of directions of a Rx beam, in which the MS 130 can receive data, is M, the simplest way to select the optimal DL Tx/Rx direction is that the BS 110 transmits a predetermined signal in each of N available Tx beam directions at least M times, and the MS 130 receives each of N Tx beams using M Rx beams. In this method, the BS 110 transmits a specific reference signal at least N×M times, and the MS 130 receives the reference signal N×M times and measures signal strength of the received reference signal. The MS 130 may determine, as the optimal Tx/Rx beam direction, the direction that shows the highest measured signal strength among the N×M measured signal strengths.

As such, the process of transmitting a signal in all possible Tx directions by the BS 110 at least once is called a beam sweeping process, and the process of selecting an optimal Tx/Rx beam direction by the MS 130 is called a beam selection process. This optimal DL Tx/Rx beam selection process may be equally applied even to an UL Tx/Rx process of transmitting data from the MS 130 to the BS 110.

FIG. 2 illustrates a beam width, an elevation angle, and an azimuth in a mobile communication system using beamforming.

It will be assumed in FIG. 2 that a BS 210 is installed in a location, for example, on a building, having a height 201 from the ground, and has a predetermined beam width 205. The beam width 205 of the BS 210 may be defined for each of the elevation angle and the azimuth. Generally, the elevation angle refers to an angle (for example, an angle between an antenna and the ground) at which an antenna for transmitting and receiving radio waves sees the satellite. In the example of FIG. 2, since an antenna of the BS 210 looks down at the ground, its elevation angle 203 may be construed as an angle between a Tx beam and the vertical surface of the building on which the BS 210 is installed. Although not illustrated in FIG. 2, the azimuth may be construed as an angle of the horizontal direction in which the Tx beam is propagated.

FIG. 3 illustrates the number of Tx beams that can be used by a BS depending on the elevation angle and the azimuth.

Specifically, FIG. 3 illustrates the number of Tx beams that can be transmitted by a BS 310, under the assumption that the BS 310 is installed on, for example, a building like in FIG. 2, and the BS 310 is installed at the height of, for example, 35 m, and transmits a Tx beam having a beam width of 5° with respect to each of the elevation angle and the azimuth in one sector having an angle of 30° and coverage of 200 m.

In the example of FIG. 3, since the number of Tx beams that can be transmitted by the BS 310 is a product of 16 elevation-angle Tx directions in units of 5° and 6 azimuth Tx directions in units of 5° for each elevation-angle Tx direction, and is 96 in total, the total number of possible Tx directions of the Tx beams is 96.

Although a Tx beam transmitted by a BS is spread in the form of a sector (or fan) when there is no obstacle, it is assumed in the example of FIG. 3 that each Tx beam reaches the ground in the form of a rectangle for the purpose of convenience. In FIG. 3, the rectangles represent 96 areas where a Tx beam having specific azimuth and elevation angle has reached the ground. The 96 Tx beams are transmitted up to the farther region as the elevation angle is greater, and the Tx beams are received in the wider region as they are transmitted far away from the BS.

A ratio written in each rectangle represents the ratio of a reception (Rx) area of the Tx beam transmitted to the location of the rectangle, to a total of 96 areas, in terms of the area. It can be understood that as illustrated in FIG. 3, even for a Tx beam having the same beam width, a Tx beam that is transmitted to the region close to the boundary area of the BS is received in a much wider area depending on the elevation angle and azimuth, compared to a Tx beam that is transmitted to the region close to the central part of the BS. Simulations show that in the example of FIG. 3 where the BS's height of 35 m and the coverage of 200 m are considered, there is an area difference of a maximum of 480 times in Rx areas of a Tx beam.

If a Tx beam having the elevation angle and azimuth of a narrow beam width illustrated in the example of FIG. 3 is used, a plurality of possible Tx beams and Rx areas exist in the BS. Particularly, if a DL synchronization channel and broadcast control channel, which are transmitted by a beam sweeping scheme, are transmitted using a Tx beam having a narrow beam width as in the example of FIG. 3, each of them are repeatedly transmitted in all Tx beam directions of the narrow beam width in the BS at least once, altogether at least 96 times. Since the number of transmissions required to transmit the DL synchronization channel and broadcast control channel by the beam sweeping scheme is proportional to the number of Tx beams available in the coverage of the BS, the simplest way to reduce the Tx overhead of the DL synchronization channel and broadcast control channel in the BS of FIG. 3 is to support the full coverage of the BS with the smaller number of Tx beams. To this end, each Tx beam may need to have a wider beam width.

Generally, however, as a beam width of a Tx beam is wider, its beamforming effects are lower in proportion thereto. Conversely, as a beam width is narrower, the beamforming effects are higher. If a beam width is reduced to increase the beamforming effects, the number of Tx beams to support one BS area increases according thereto, causing an increase in the overhead associated with transmitting the broadcast-type channels. As such, the beamforming effects and the broadcast channel transmission overhead have a trade-off relationship with each other.

In order to effectively solve these and other problems and disadvantages, a new scheme is generally used, that makes a beam width used to transmit broadcast channels different from a beam width used to transmit user data. For example, a Tx beam having a beam width of 30° may be used as a Tx beam for transmitting broadcast channels in a sector having a beam width of 60°, and a Tx beam having a beam width of 10° may be used as a Tx beam for transmitting user data. In this scheme of using, a plurality of different beam widths, a Tx beam having a wide beam width is called a wide beam or a coarse beam, while a Tx beam having a narrow beam width is called a narrow beam or a fine beam.

Generally, a narrow Tx/Rx beam has a high antenna gain, but may not ensure the communication performance due to its narrow beam width if the Tx/Rx beam deviates from its direction. In addition, in the case of the narrow Tx/Rx beam, since its Tx/Rx range is limited, link fragility may occur in which the communication is cut off instantly, if a reflector or an object that is difficult to penetrate, is present between a Tx beam and a Rx beam.

SUMMARY OF THE INVENTION

To address the above-discussed deficiencies of the prior art, it is a primary object to provide a communication method and apparatus for jointly transmitting and receiving a signal in a mobile communication system including a plurality of Base Stations (BSs).

Another aspect of the present disclosure is to provide an efficient method and apparatus in which a plurality of BSs jointly transmit and receive a signal in a mobile communication system using beamforming.

Yet another aspect of the present disclosure is to provide an efficient frame structure by which a plurality of BSs jointly transmit and receive a signal in a mobile communication system using beamforming.

In accordance with an aspect of the present disclosure, there is provided a communication method performed by a Mobile Station (MS) in a mobile communication system including a plurality of Base Stations (BSs). The method includes receiving at least one reference signal through at least one receive beam in a direction of nearby BSs, determining at least one candidate BS for joint transmission/reception among the nearby BSs based on the received at least one reference signal, and transmitting information about the determined at least one candidate BS to a serving BS.

In accordance with another aspect of the present disclosure, there is provided a Mobile Station (MS) for performing communication in a mobile communication system including a plurality of Base Stations (BSs). The MS includes a transceiver configured to communicate with at least one BS over a wireless network. The MS also includes a controller configured to determine at least one candidate BS for joint transmission/reception among nearby BSs based on at least one reference signal that is received through at least one receive beam in a direction of the nearby BSs by means of the transceiver, and control an operation of the transceiver to transmit information about the determined at least one candidate BS to a serving BS.

In accordance with yet another aspect of the present disclosure, there is provided a communication method by a Base Station (BS) in a mobile communication system using beamforming. The method includes receiving, from a Mobile Station (MS), information about at least one candidate BS for joint transmission/reception, which is determined based on each reference signal of nearby BSs, and allocating resources for the joint transmission/reception to the MS by negotiating with at least one BS among BSs corresponding to the received information about the candidate BS.

In accordance with still another aspect of the present disclosure, there is provided a Base Station (BS) for performing communication in a mobile communication system using beamforming. The BS includes a transceiver configured to communicate with a Mobile Station (MS) over a wireless network, and communicate with nearby BSs over a wired/wireless network. The BS also includes a controller configured to receive, from the MS, information about at least one candidate BS for joint transmission/reception, which is determined based on each reference signal of the nearby BSs, and allocate resources for the joint transmission/reception to the MS by negotiating with at least one BS among BSs corresponding to the received information about the candidate BS.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A to 6C illustrate an example of a reception time of a reference signal that a MS has received through each Rx beam in the example of FIG. 5;

Throughout the drawings, like reference numerals will be understood to refer to like parts, components, and structures.

DETAILED DESCRIPTION OF THE INVENTION

Figure 1:
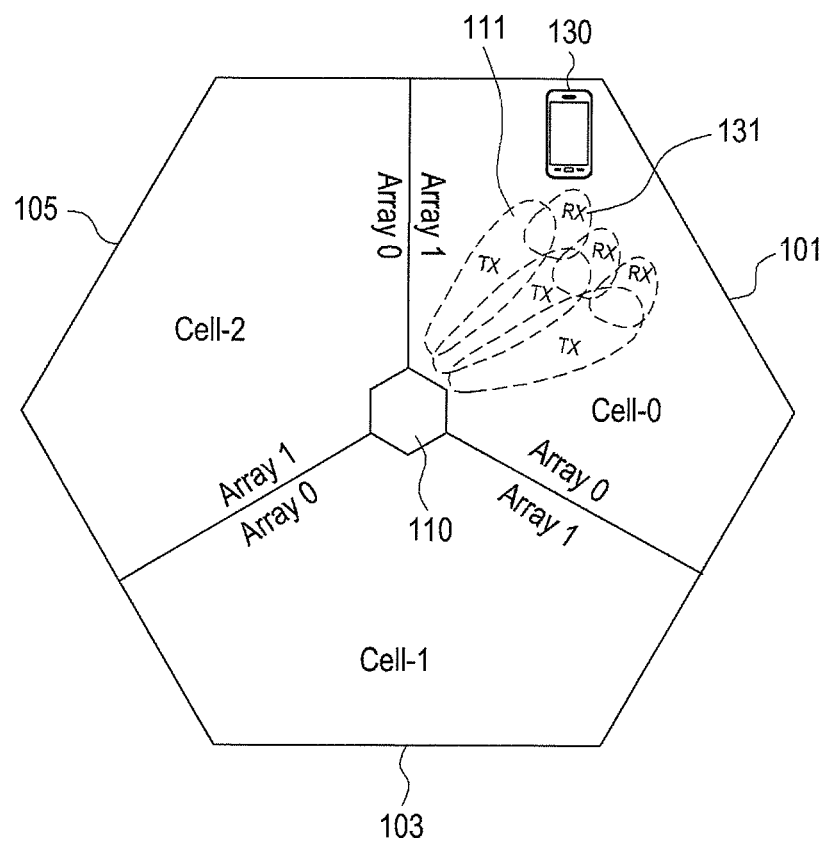
FIG. 1 illustrates a mobile communication system including a MS and a BS that provides beamforming using array antennas.
Figure 2:
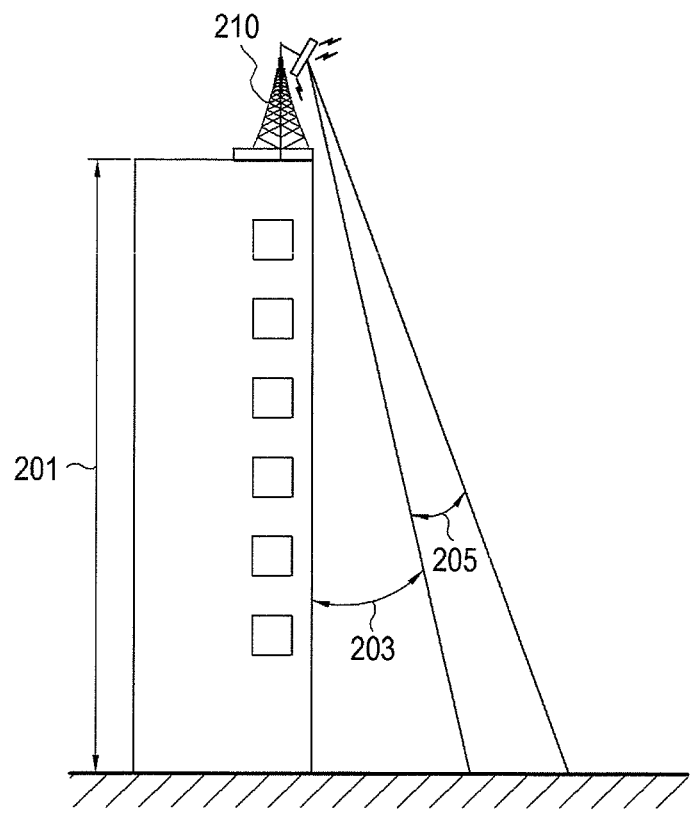
FIG. 2 illustrates a beam width, an elevation angle, and an azimuth in a mobile communication system using beamforming.
Figure 3:
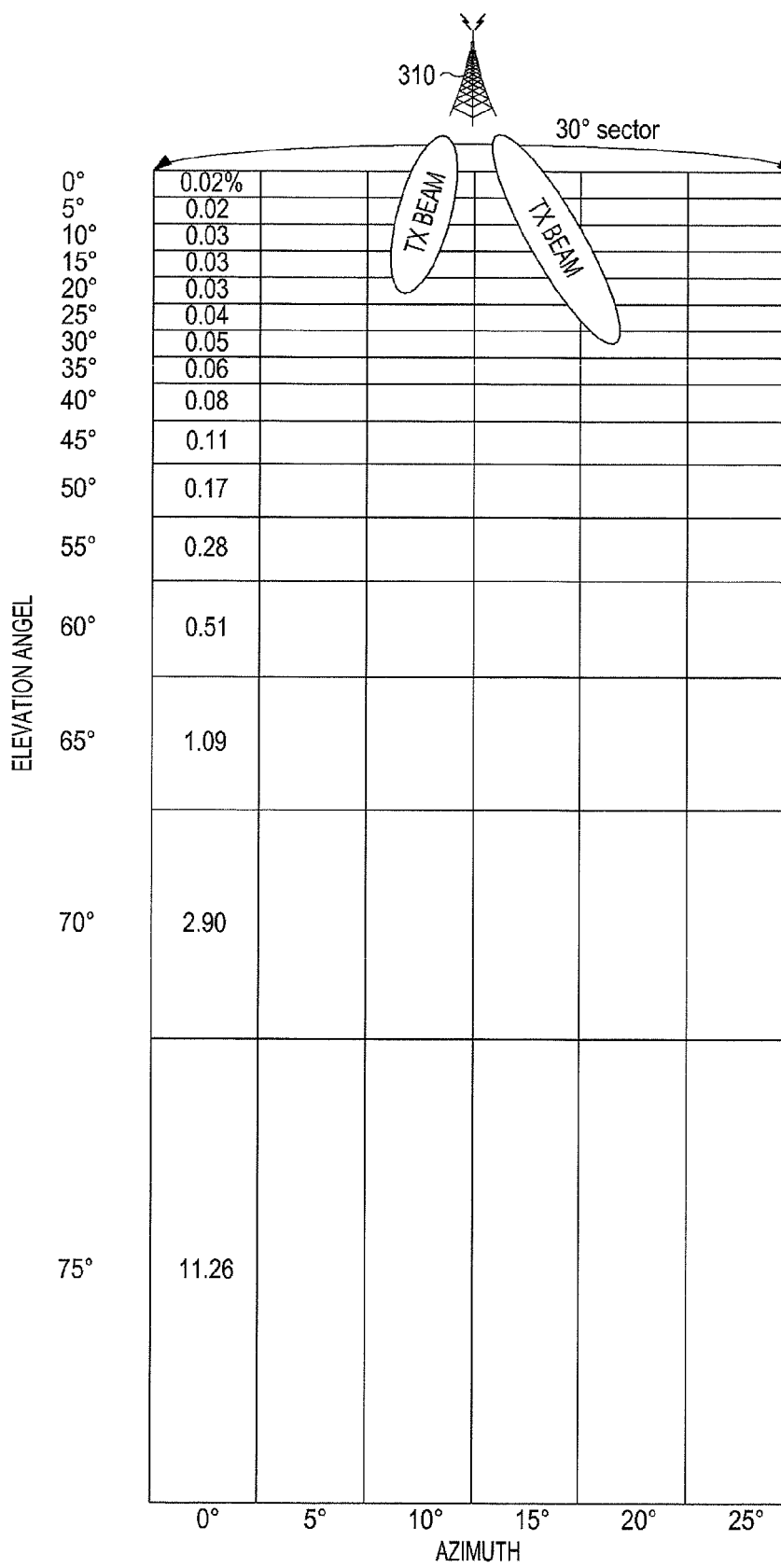
FIG. 3 illustrates the number of Tx beams that can be used by a BS depending on the elevation angle and the azimuth.

FIGS. 4 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present disclosure provide a way to solve the link fragility problem while maintaining a data Transmit (Tx)/Receive (Rx) channel with one Mobile Station (MS) by a plurality of Base Stations (BSs) in a mobile communication system using beamforming.

In addition, embodiments of the present disclosure provide a way to efficiently maintain a data Tx/Rx channel with one MS by a plurality of BSs using joint transmission and joint reception schemes in a mobile communication system using beamforming.

To this end, embodiments of the present disclosure provide a technique in which a MS receives reference signals (or pilot signals) transmitted by a plurality of BSs, determines a target BS (or a candidate BS) for joint transmission/reception based on the information, such as information about a Rx beam through which a reference signal is received from each BS, a reception delay between received reference signals, and a combining gain that is calculated based on the received reference signals, and reports information about the determined candidate BS to a serving BS and/or the candidate BS.

Although an operation proposed by embodiments of the present disclosure will be described below on the assumption of a network structure in which one BS is comprised of a plurality of sectors, the embodiments of the present disclosure may be applied to a network structure that is comprised of a single access node regardless of whether it is a sector and a BS.

Figure 4:
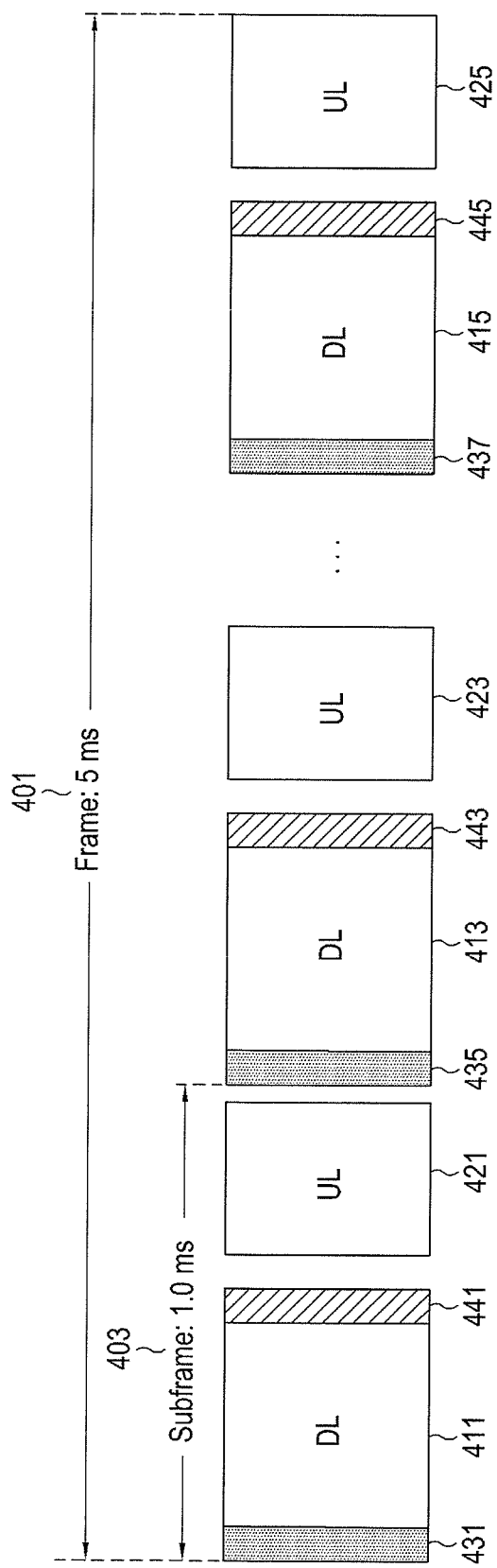
FIG. 4 illustrates an example of a frame structure in a mobile communication system using a beamforming technique according to an embodiment of this disclosure.

FIG. 4 illustrates an example of a frame structure in a mobile communication system using a beamforming technique according to an embodiment of the present disclosure.

Referring to FIG. 4, for example, one frame 401 has a length of 5 ms, and includes 5 sub-frames 403. The sub-frames 403 include Downlink (DL) Tx intervals 411, 413 and 415 in which a BS transmits a signal to a MS, and Uplink (UL) Tx intervals 421, 423 and 425 in which the MS transmits a signal to the BS. Some of the DL Tx intervals 411, 413 and 415 are used as scheduling areas 431, 435 and 437 for carrying scheduling information, and another some of the DL Tx intervals 411, 413 and 415 are used as reference signal areas 441, 443 and 445 for carrying DL reference signals.

Figure 5:
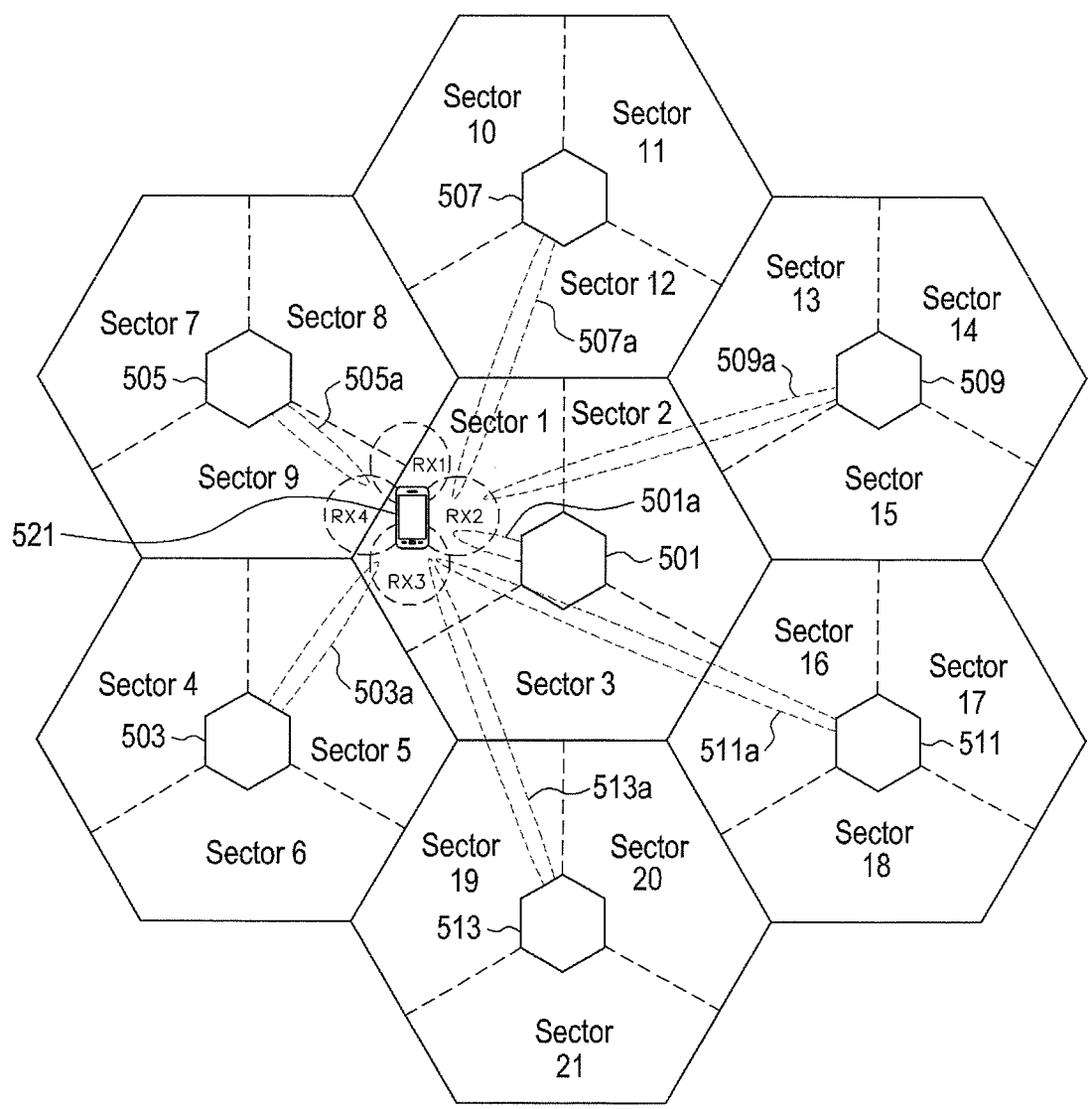
FIG. 5 illustrates a method for determining a candidate BS for joint transmission/reception among a plurality of BSs according to an embodiment of this disclosure.

FIG. 5 illustrates a method for determining a candidate BS for joint transmission/reception among a plurality of BSs according to an embodiment of the present disclosure.

In the example of FIG. 5, a plurality of BSs 501 to 513 and a MS 521 set up a data Tx/Rx channel by the joint transmission and/or joint reception scheme. To this end, the MS 521 receives reference signals transmitted by the plurality of BSs 501 to 513 through Rx beams RX1 to RX4 in their associated BS directions, respectively.

It is assumed in FIG. 5 that a serving BS 501 among the plurality of BSs 501 to 513 transmits and receives data to/from the MS 521 in a sector #1 closest to the MS 521, using a single-point transmission/reception scheme.

It is also assumed in FIG. 5 that the MS 521 uses 4 different Rx beams RX1~RX4 each having, for example, a 90°-azimuth beam width, and the MS 521 receives the reference signals that the plurality of BSs 501 to 513 have transmitted in directions of different Tx beams 501a to 513a, respectively, for a direction of each Rx beam. It is noted that the azimuth beam width and the number of Rx beams are merely illustrative, and the present disclosure is not limited thereto. Although it is assumed in this example that a MS receives a reference signal transmitted by a specific BS (or sector), through one Rx beam, a reference signal transmitted by a specific BS (or sector) may be received through one or more Rx beams. In this example, if reference signals transmitted by specific BSs (or sectors) in different directions are received through one Rx beam of a MS, the MS may determine whether the transmission/reception is joint transmission/reception, using the reference signal having the highest signal strength among the reference signals.

In the case of FIG. 5, no reference signal of nearby BSs is received through a Rx beam RX1 of the MS 521, reference signals transmitted in a sector #1, a sector #12 and a sector #13 are received through a Rx beam RX2, reference signals transmitted in a sector #5, a sector #16 and a sector #19 are received through a Rx beam RX3, and a reference signal transmitted in a sector #9 is received through a Rx beam RX4.

FIGS. 6A to 6C illustrate an example of a reception time of a reference signal that a MS has received through each Rx beam in the example of FIG. 5.

In the example of FIG. 6, a reference signal received from each sector #n in FIG. 5 is represented as a reference signal #n having the like reference numeral. FIG. 6A illustrates a case where reference signals #1, #12 and #13 (i.e., reference signals received from the sectors #1, #12 and #13 in FIG. 5) received through a Rx beam RX2 at each reception time of a reference signal are all received within a Cyclic Prefix (CP) length of an Orthogonal Frequency Division Multiplexing (OFDM) symbol. In FIG. 6B, in the case of reference signals #5, #16 and #19 received through a Rx beam RX3, the reference signals #5 and #19 are located within a CP length in terms of the reception time. However, in FIG. 6C, the reference signals #5 and #16 are different by a CP length or more, in terms of their reception times.

In an embodiment of the present disclosure, a MS determines a candidate BS for joint transmission/reception based on the information, such as information about a Rx beam through which a reference signal of each BS is received, a reception delay between received reference signals, and a combining gain that is calculated based on each received reference signal. The rules (or conditions), which are proposed in an embodiment of the present disclosure to determine the candidate BS, are as follows.

First, Decision Rule 1 is to satisfy at least one of the following Condition 1-1 to Condition 1-3, and it will be assumed in this embodiment that Decision Rule 1 is to satisfy all of Condition 1-1 to Condition 1-3.

Condition 1-1: A Rx beam through which at least one reference signal is received from a nearby BS is the same as a Rx beam through which a reference signal of the serving BS is received.

Condition 1-2: A reception time of the at least one reference signal is within a predetermined reception delay time, when it is compared with a reception time of a reference signal received from the serving BS.

Condition 1-3: If a nearby BS that transmitted the at least one reference signal, and the serving BS have jointly transmitted the same signals, an expected combining gain of a combined signal of the same signals is greater than or equal to a target value, or strength of the combined signal, which is expected when the same signals are jointly received at a MS, is greater than the signal strength of the current serving BS by a target value or more.

A CP length used in the OFDM transmission/reception technique may be used as the reception delay value used in Condition 1-2. As the CP length, the same CP length as that used in the single-point transmission/reception technique may be used, or a CP length separately defined for joint transmission/reception may be used.

A method of determining an expected strength of a combined signal when two or more BSs including the serving BS have jointly transmitted the same signals in Condition 1-3, may include, for example, a method in which a MS adds strengths (or energies) of the reference signals received from the two or more BSs. The method of determining the combining gain may include a method of determining an expected combining gain by comparing the expected strength of a combined signal with the strength of the reference signal received from the serving BS.

Decision Rule 1 will be described in more detail with reference to FIGS. 5 and 6. In the examples of FIGS. 5 and 6, a sector of the serving BS 501, in which the MS 521 exchanges data with the serving BS 501 using the single-point transmission/reception scheme, is a sector #1. Among the reference signals that the MS 521 has received from the nearby BSs 503 to 513, the reference signals received through, for example, the sectors #12 and #13 are received using the same Rx beam RX2 as that of the reference signal received from the serving BS 501, satisfying Condition 1-1.

When the reception times of the reference signals that the MS 521 has received through the sectors #12 and #13 are compared with the time at which a reference signal is received from the serving BS 501, they are all received within a CP length, satisfying Condition 1-2.

If an expected combining gain for the reference signal #1 received through the sector #1 and the reference signal #12 received through the sector #12 is greater than or equal to a predetermined target value, the sector #12 satisfies all of Conditions 1-1, 1-2 and 1-3 of Decision Rule 1, and the MS 521 reports a BS 507 of the sector #12 through which the reference signal #12 is received, or the reference signal of the BS 507, to the serving BS 501 as a candidate BS for joint transmission/reception.

If an expected combining gain for the reference signal #1 received through the sector #1 and the reference signal #13 received through the sector #13 does not exceed a specific target value, the sector #13 satisfies Conditions 1-1 and 1-2 of Decision Rule 1, but may not satisfy Condition 1-3, so the MS 521 does not report the BS 509 of the sector #13 to the serving BS 501 as a candidate BS for joint transmission/reception.

Another example of the decision rule of determining a candidate BS for joint transmission/reception, which is proposed by an embodiment of the present disclosure, is as follows.

Decision Rule 2 is to satisfy at least one of the following Condition 2-1 to Condition 2-3, and it will be assumed in this embodiment that Decision Rule 2 is to satisfy all of Condition 2-1 to Condition 2-3.

Condition 2-1: A Rx beam through which two or more reference signals are received from nearby BSs are different from the Rx beam through which a reference signal of the serving BS is received.

Condition 2-2: Reception times of the two or more reference signals are within a specific reception delay.

Condition 2-3: If nearby BSs that transmitted the two or more reference signals have jointly transmitted the same signals, an expected combining gain of a combined signal of the same signals is greater than or equal to a target value, or strength of the combined signal, which is expected when the same signals are jointly received at a MS, is greater than the signal strength of the current serving BS by a target value or more.

As the reception delay value used in Condition 2-2, similar to the value used in Condition 1-2, a CP length used in the single-point transmission/reception technique may be used, or a CP length separately defined for joint transmission/reception may be used.

A method of determining an expected strength of a combined signal or an expected combining gain when two or more nearby BSs have jointly transmitted the same signals in Condition 2-3, is the same as the method used in Condition 1-3. For example, the method may include a method of adding strengths (or energies) of the reference signals received from the two or more nearby BSs.

Decision Rule 2 will be described in more detail with reference to FIGS. 5 and 6. In the examples of FIGS. 5 and 6, among the reference signals that the MS 521 has received from the nearby BSs, the reference signals received through the sectors #5, #16 and #19 are received through a Rx beam RX3 which is different from the Rx beam through which the reference signal is received from the serving BS 501, satisfying Condition 2-1.

The reference signal that the MS 521 has received through the sector #9 using the Rx beam RX4, is also received through a Rx beam which is different from the that of the serving BS 501, but only one reference signal is received through the Rx beam RX4. In this case, therefore, because there are no multiple reference signals which are the target for joint transmission/reception, the MS 521 determines that the BS 505 of the sector #9 that does not satisfy Decision Rule 2 is not a candidate BS for joint transmission/reception.

When reception times of the reference signals received through the sectors #5 and #19 are compared with each other, they are received within a CP length, so the MS 521 determines that they satisfy Condition 2-2. Likewise, the reference signals received from the sectors #16 and #19 are also received within a CP length, so the MS 521 determines that they satisfy Condition 2-2.

If an expected combining gain for the reference signal #5 received through the sector #5 and the reference signal #19 received through the sector #19 is greater than or equal to a predetermined target value, the sectors #5 and #19 satisfy all of Conditions 2-1, 2-2 and 2-3 of Decision Rule 2, and the MS 521 reports the BSs 503 and 513 of the sectors #5 and #19 from which the reference signals #5 and #19 are received, or the reference signals of the BSs 503 and 513, to the serving BS 501 as candidate BSs for joint transmission/reception.

If an expected combining gain for the reference signal #16 received through the sector #16 and the reference signal #19 received through the sector #19 does not exceed a specific target value, the sectors #16 and #19 satisfy Conditions 2-1 and 2-2, but do not satisfy Condition 2-3, so the MS 521 does not report the two BSs 511 and 513 of the sectors #16 and #19 to the serving BS 501 as candidate BSs for joint transmission/reception.

Another example of the decision rule of determining a candidate BS for joint transmission/reception, which is proposed by an embodiment of the present disclosure, is as follows.

Decision Rule 3 is to satisfy at least one of the following Condition 3-1 to Condition 3-3, and it will be assumed in this embodiment that Decision Rule 3 is to satisfy all of Condition 3-1 to Condition 3-3.

Condition 3-1: When a MS uses a Rx beam whose beam width is wider than the beam width of the Rx beam used in the single-point transmission/reception scheme, two or more reference signals are received from nearby BSs.

Condition 3-2: Reception times of the two or more reference signals are within a specific reception delay.

Condition 3-3: If nearby BSs that transmitted the two or more reference signals have jointly transmitted the same signals, an expected combining gain of a combined signal of the same signals is greater than or equal to a target value, or strength of the combined signal, which is expected when the same signals are jointly received at a MS, is greater than the signal strength of the current serving BS by a target value or more.

As the reception delay value used in Condition 3-2, similar to the value used in Condition 1-2 and Condition 2-2, a CP length used in the single-point transmission/reception technique may be used, or a CP length separately defined for joint transmission/reception may be used.

A method of determining an expected strength of a combined signal or an expected combining gain when two or more nearby BSs have jointly transmitted the same signals in Condition 3-3, is the same as the method used in Condition 1-3 and Condition 2-3. For example, the method may include a method of adding strengths (or energies) of the reference signals received from the two or more nearby BSs.

Figure 7:
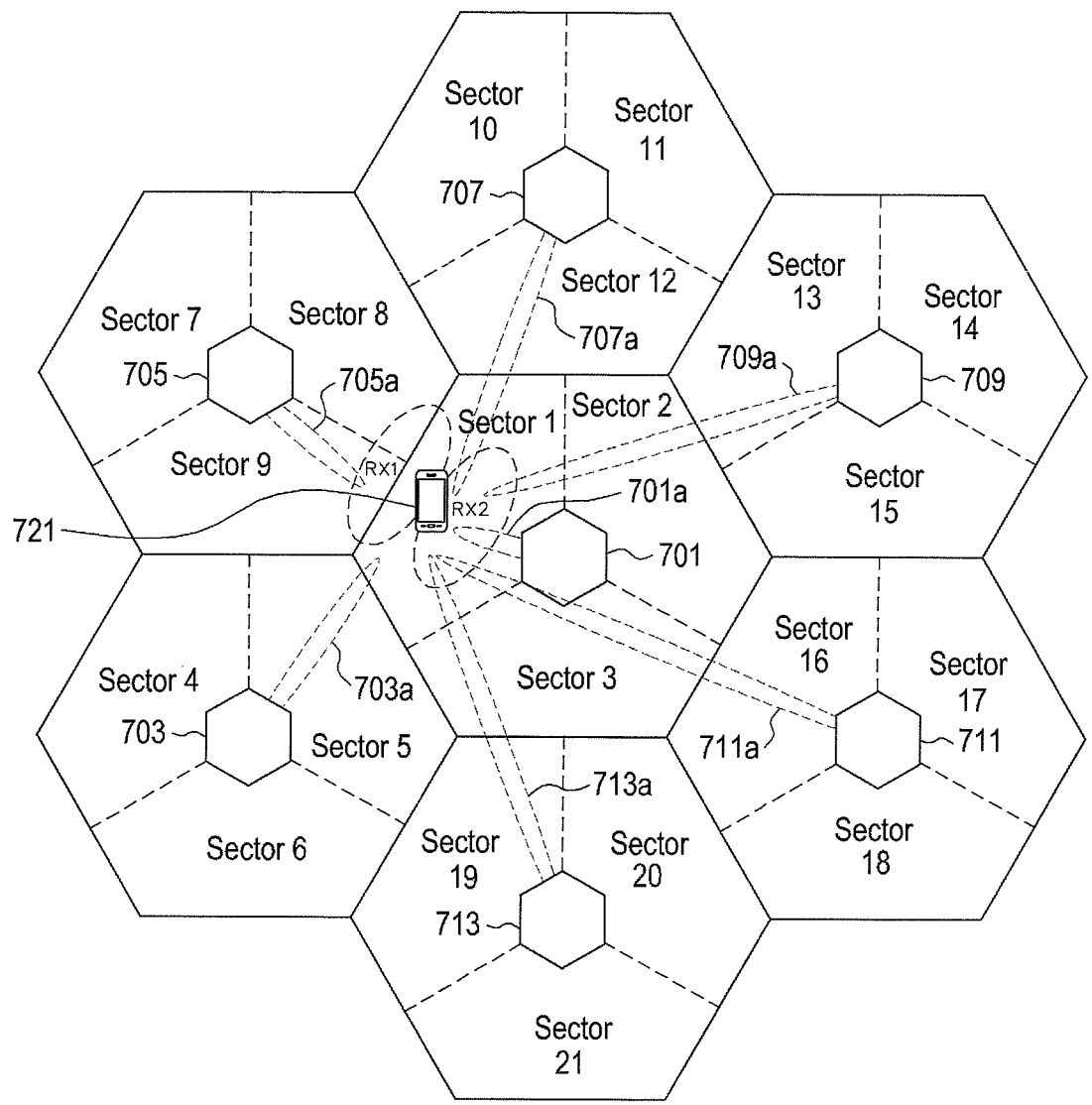
FIG. 7 illustrates a method for determining a candidate BS for joint transmission/reception among a plurality of BSs according to another embodiment of this disclosure.

FIG. 7 illustrates a method for determining a candidate BS for joint transmission/reception among a plurality of BSs according to another embodiment of the present disclosure.

In the example of FIG. 7, a plurality of BSs 701 to 713 and a MS 721 set up a data Tx/Rx channel for joint transmission and/or joint reception. To this end, the MS 721 receives reference signals transmitted from the plurality of BSs 701 to 713 through Rx beams RX1 and RX2 in their associated BS directions, respectively.

The MS 721 receives reference signals from nearby BSs using a Rx beam whose beam width is wider than that of the Rx beam commonly used for single-point transmission/reception. For example, the MS 721 receives reference signals using two Rx beams RX1 and RX2 each having a 180°-azimuth beam width. It is assumed that the MS 721 receives the reference signals that the plurality of BSs 701 to 713 have transmitted in directions of different Tx beams 501*a* to 513*a*, respectively, for a direction of each Rx beam.

However, it is noted that the azimuth beam width and the number of Rx beams are merely illustrative, and the present disclosure is not limited, thereto. Although it is assumed in this example that a MS receives a reference signal transmitted by a specific BS (or sector), through one Rx beam, a reference signal transmitted by a specific BS (or sector) may be received through one or more Rx beams. In this example, if reference signals transmitted by specific BSs (or sectors) in different directions are received through one Rx beam of a MS, the MS may determine whether the transmission/reception is joint transmission/reception, using the reference signal having the highest signal strength among the reference signals.

In the case of FIG. 7, the MS 721 receives reference signals transmitted from the BSs 703 and 705 of the sectors #5 and #9 using a Rx beam RX1, and receives reference signals transmitted from the BSs 707, 709, 711 and 713 of the sectors #1, #12, #13, #16 and #19 using a Rx beam RX2.

If Decision Rule 3 is applied to the example of FIG. 7, the reference signals #5 and #9 received using the Rx beam RX1 satisfy Condition 3-1, and the reference signals #1, #12, #13, #16 and #19 received using the Rx beam RX2 satisfy Condition 3-1. The MS 721 applies Conditions 3-2 and 3-3 to the plurality of reference signals satisfying Condition 3-1, similar to the example of Decision Rules 1 and 2, and reports the plurality of nearby BSs satisfying all conditions, or their reference signals to the serving BS 701 as candidate BSs for joint transmission/reception.

In accordance with the method proposed by an embodiment of the present disclosure, a serving BS determines at least one nearby BS that will perform joint transmission/reception, based on the information about a candidate BS for joint transmission/reception, which is reported by a MS, and negotiates with the nearby BS over a resource area to be used for the joint transmission/reception and a physical layer transmission scheme to be used in the area.

In an embodiment of the present disclosure, a resource area for joint transmission/reception may include at least one of a DL scheduling area in which a plurality of BSs jointly transmit scheduling information to a MS, an area in which the plurality of BSs jointly transmit DL data to the MS, and an area in which the plurality of BSs jointly transmit DL control information to the MS, and may also include at least one of an area in which the plurality of BSs jointly receive UL data from the MS, and an area in which the plurality of BSs jointly receive UL control information from the MS.

In addition, the physical layer transmission scheme for joint transmission/reception may be the same as, or different from the physical layer transmission scheme for single-point transmission/reception. Specifically, it may include CP length, Tx/Rx beam width, Tx power control information and the like.

Figure 8:
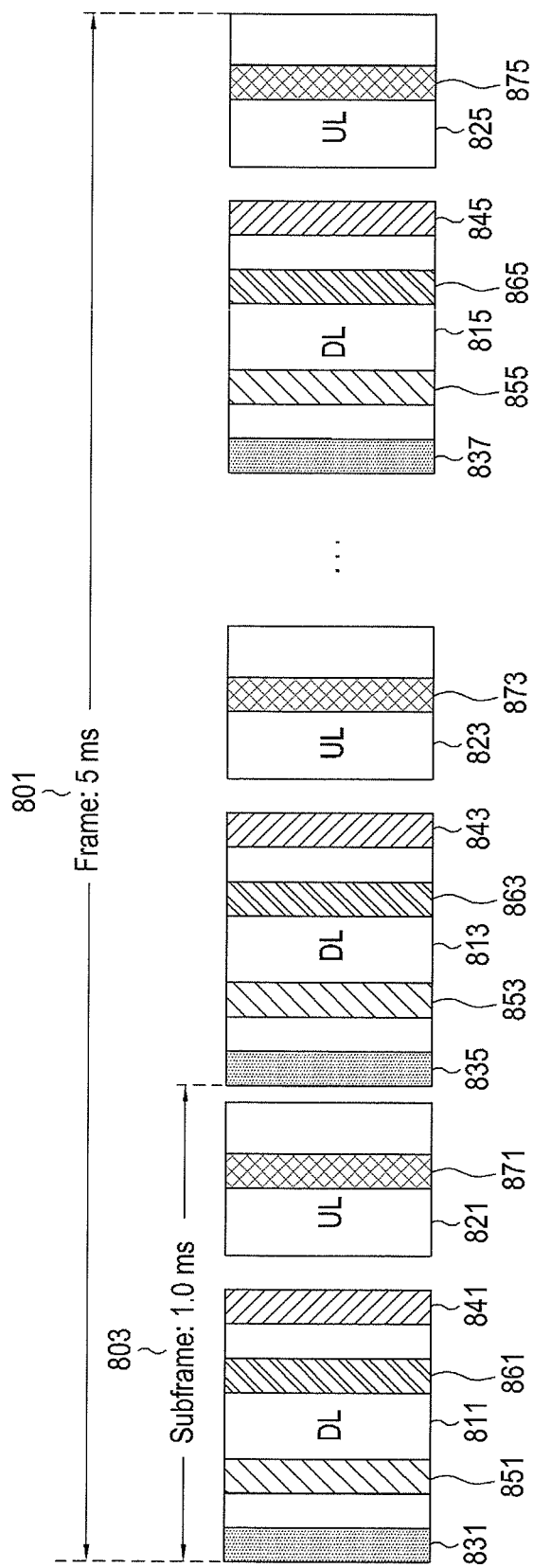
FIG. 8 illustrates an example of a frame structure including a resource area for joint transmission/reception, which is used by a plurality of BSs, according to an embodiment of this disclosure.

FIG. 8 illustrates an example of a frame structure including a resource area for joint transmission/reception, which is used by a plurality of BSs, according to an embodiment of the present disclosure. The resource area may be a time-frequency resource area in the case of an OFDM system, and may be expressed in various forms of combinations of resources such as the time, frequency, code, and the like, depending on the transmission scheme applied to the mobile communication system.

In the example of FIG. 8, for example, one frame 801 has a length of 5 ms, and includes 5 sub-frames 803. The sub-frames 803 include DL Tx intervals 811, 813 and 815 in which a BS transmits a signal to a MS, and UL Tx intervals 821, 823 and 825 in which the MS transmits a signal to the BS. In this frame structure, like in the frame structure of FIG. 4, some of the DL Tx intervals 811, 813 and 815 are used as first scheduling areas 831, 835 and 837 for carrying general scheduling information, and another some of the DL Tx intervals 811, 813 and 815 are used as reference signal areas 841, 843 and 845 for carrying DL reference signals.

In the frame structure of FIG. 8, a plurality of BSs participating in the joint transmission/reception set second scheduling areas 851, 853 and 855 for the joint transmission/reception, in addition to the first scheduling area 831, 835 and 837 used for the single-point transmission/reception. User data that the plurality of BSs jointly transmit or receive is dynamically scheduled in the second scheduling areas 851, 853 and 855, and the resource areas where the jointly transmitted/received data is actually transmitted/received, are indicated by the second scheduling areas 851, 853 and 855.

In addition, the plurality of BSs set joint Tx control channel areas 861, 863 and 865 for jointly transmitting DL control signals by the plurality of BSs, and joint Rx control channel areas 871, 873 and 875 for jointly receiving UL control signals by the plurality of BSs. In the example of FIG. 8, the resource areas in which joint transmission/reception is used may be different from the areas in which single-point transmission/reception is used, in terms of the physical layer transmission scheme applied thereto. For example, considering the delay of signals received from a plurality of BSs, a CP length used for the joint transmission/reception may set longer than that of the single-point transmission/reception, and in order to ensure the wider Rx area, the MS may be set to use a wider Rx beam width.

It will be apparent to those of ordinary skill in the art that the second scheduling areas 851, 853 and 855 for joint transmission/reception, the joint Tx control channel areas 861, 863 and 865, and the joint Rx control channel areas 871, 873 and 875 may be optionally included in the frame structure of FIG. 8 depending on the operation of the communication system. As another example, at least one of the second scheduling areas 851, 853 and 855, the joint Tx control channel areas 861, 863 and 865, and the joint Rx control channel areas 871, 873 and 875 may be included only in a predetermined sub-frame interval.

As another example, in the frame structure of FIG. 4, scheduling information used for single-point transmission/reception and scheduling information used for joint transmission/reception may be carried together in the scheduling areas 431, 435 and 437. In this case, the scheduling information may be set to indicate whether it is for single-point transmission/reception or for joint transmission/reception.

Figure 15:
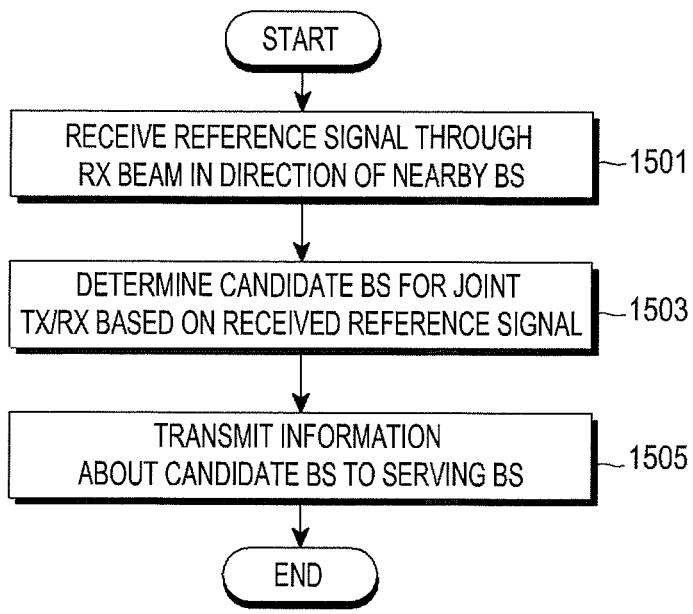
FIG. 15 illustrates a MS's method for joint transmission/reception according to an embodiment of this disclosure.

FIG. 15 illustrates a MS's method for joint transmission/reception according to an embodiment of the present disclosure, in which a communication environment having a plurality of BSs performing joint transmission/reception with a MS in a mobile communication system is assumed.

Referring to FIG. 15, in operation 1501, the MS receives at least one reference signal through at least one Rx beam in directions of its nearby BSs. In operation 1503, the MS determines at least one candidate BS for joint transmission/reception among the nearby BSs based on the received at least one reference signal. In operation 1505, the MS transmits information about the determined at least one candidate BS to its serving BS. Then, the serving BS negotiates with at least one BS among the determined at least one candidate BS, and may perform joint transmission/reception for the MS with the successfully negotiated BS.

Figure 9:
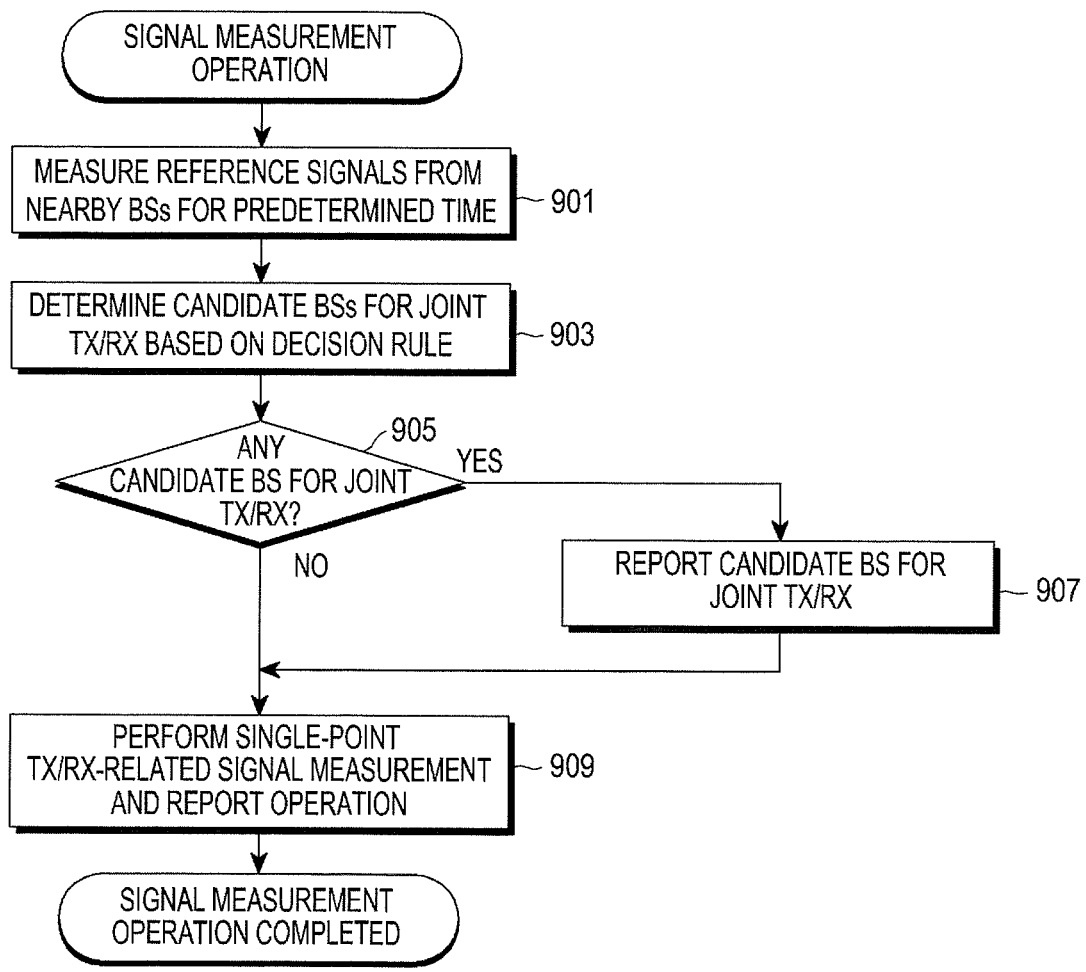
FIG. 9 illustrates a MS's method for transmitting information about a candidate BS for joint transmission/reception by a plurality of BSs according to an embodiment of this disclosure.

FIG. 9 illustrates a MS's method for transmitting information about a candidate BS for joint transmission/reception according to an embodiment of the present disclosure.

First, it will be assumed that a serving BS of a MS has been determined in accordance with the general communication procedure. Referring to FIG. 9, in operation 901, the MS receives reference signals that its nearby BSs have transmitted in the resource areas defined in FIG. 4 or 8, for a predetermined time, and measures their signal strengths (or channel status). The MS's operation of measuring reference signals in operation 901 may be performed more than once, using one or both of the physical layer transmission scheme used for single-point transmission/reception and the physical layer transmission scheme used for joint transmission/reception.

In operation 903, the MS determines whether there is at least one candidate BS for joint transmission/reception, by applying any one of Decision Rules 1 to 3 which are proposed in an embodiment of the present disclosure using the reference signals received from its nearby BSs. If there is a candidate BS for joint transmission/reception in operation 905, the MS reports information (hereinafter, referred to as 'candidate BS information') about the candidate BS for joint transmission/reception to the serving BS, in operation 907. The candidate BS information may include the measurement results for the candidate BS in operation 901, and identification information for the candidate BS.

In operation 909, the MS performs a single-point transmission/reception-related signal measurement and report operation for the service BS, and then completes the measurement-related operation. The operation of operation 909 may be performed before operation 901.

If there is no candidate BS for joint transmission/reception in operation 905, the MS immediately performs the single-point transmission/reception-related signal measurement and report operation in operation 909, and then ends the measurement-related operation.

Figure 16:
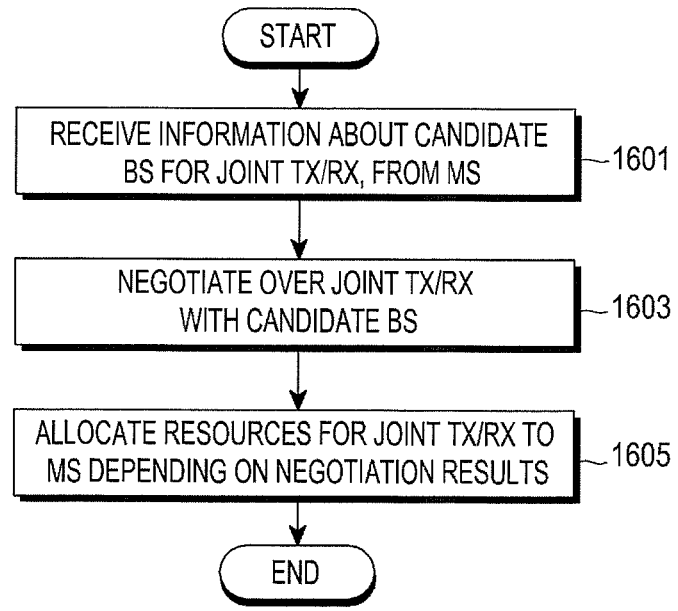
FIG. 16 illustrates a BS's method for joint transmission/reception according to an embodiment of this disclosure.

FIG. 16 illustrates a BS's method for joint transmission/reception according to an embodiment of the present disclosure, in which a communication environment having a plurality of BSs performing joint transmission/reception with a MS in a mobile communication system is assumed.

Referring to FIG. 16, in operation 1601, a serving BS receives, from a MS, information about at least one candidate BS for joint transmission/reception that the MS has determined based on reference signals of its nearby BSs. The serving BS negotiates with at least one BS among the BSs corresponding to the received candidate 13S information in operation 1603, and allocates resources for the joint transmission/reception to the MS based on the negotiation results in operation 1605. As a result, the serving BS may perform joint transmission/reception for the MS with the successfully negotiated at least one BS.

Figure 10:
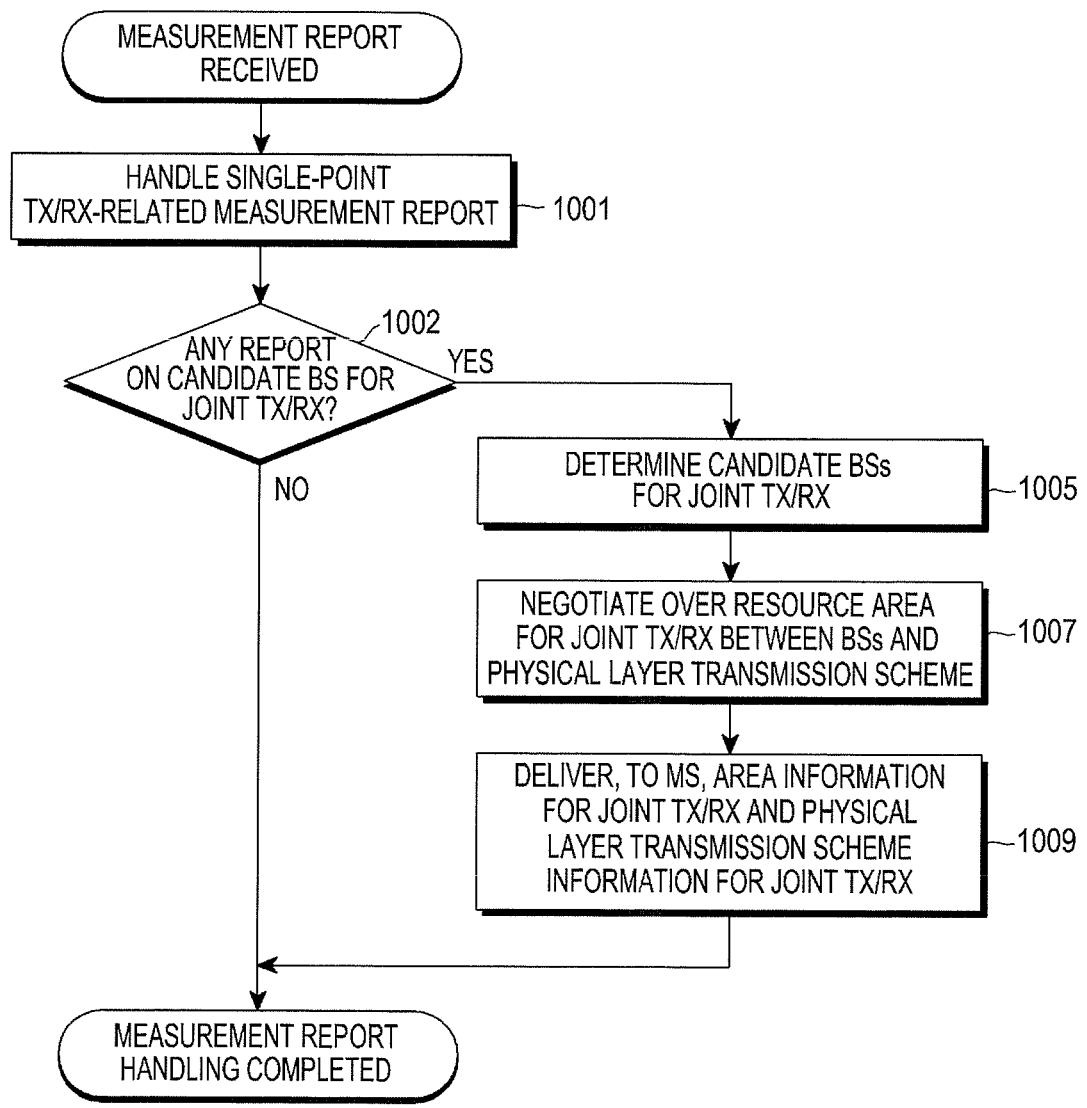
FIG. 10 illustrates a BS's method for receiving information about a candidate BS for joint transmission/reception by a plurality of BSs according to an embodiment of this disclosure.

FIG. 10 illustrates a BS's method for receiving information about a candidate BS for joint transmission/reception according to an embodiment of the present disclosure, in which the BS refers to a serving BS for a MS.

Referring to FIG. 10, in operation 1001, the BS handles the single-point transmission/reception-related measurement reports that the MS sent in accordance with the method of FIG. 9. The BS determines in operation 1002 whether information about the candidate BS for joint transmission/reception is received from the MS. Upon receiving the candidate BS information in operation 1002, the BS performs signaling or negotiation for joint transmission/reception with the nearby BSs based on the candidate BS information in operation 1005. Based on the results on the signaling or negotiation, a nearby BS participating in joint transmission/reception is finally determined. Therefore, even for a candidate BS included in the candidate BS information, there may be a candidate BS that does not actually participate in joint transmission/reception, depending on the signaling or negotiation.

In operation 1007, the BS determines the resource areas and physical layer transmission scheme to be used for joint transmission/reception through the negotiation with the nearby BSs determined for joint transmission/reception. The physical layer transmission scheme may include, for example, the CP length, Tx/Rx beam width, Tx power control information and the like. In operation 1009, the BS transmits, to the MS, joint transmission/reception-related setting information including information about a BS participating joint transmission/reception, information about resource areas (i.e., resource allocation information) to be used for joint transmission/reception, and physical layer transmission scheme information, and then, ends the MS's operation of handling the measurement reports.

Figure 11:
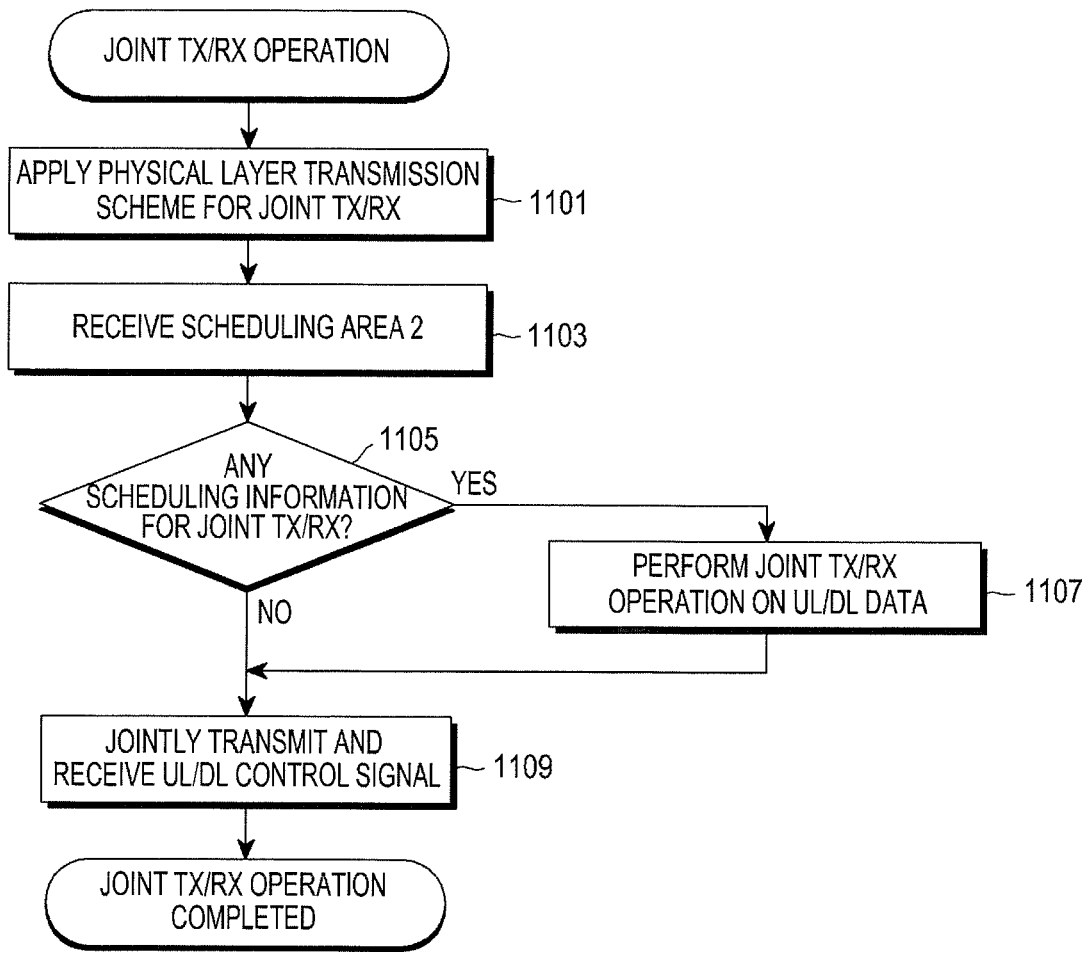
FIG. 11 illustrates a MS's operation for joint transmission/reception according to an embodiment of this disclosure.

FIG. 11 is a flowchart illustrating a MS's operation for joint transmission/reception according to an embodiment of the present disclosure, in which it is assumed that the frame structure of FIG. 8 is applied.

In operation 1101, the MS applies the physical layer transmission scheme for joint transmission/reception that a BS has set through the process of FIG. 10. The physical layer transmission scheme may include, for example, the CP length, Tx/Rx beam width, Tx power control information and the like. In operations 1103 and 1105, the MS receives second scheduling areas in the frame of FIG. 8, which are transmitted by the joint transmission scheme, and determines whether there is scheduling information for joint data transmission/reception. If it is determined in operation 1105 that scheduling information for joint data transmission/reception exists in the second scheduling areas, the MS performs in operation 1107 an operation of receiving DL data that is jointly transmitted from a plurality of BSs or jointly transmitting UL data to the plurality of BSs, in the resource areas indicated by the scheduling information of the second scheduling areas, using the physical layer transmission information. Thereafter, in operation 1109, the MS performs an operation of jointly transmitting and receiving UL/DL control signals related to data transmission/reception in the resource areas which are set through the process of FIG. 10.

Alternatively, if there is no scheduling information for joint data transmission/reception in the second scheduling areas in operation 1105, the MS directly proceeds to operation 1109 to jointly transmit and receive UL/DL control signals, omitting the operation of operation 1107. In an alternative embodiment, the MS may jointly transmit and receive only UL/DL data, or may jointly transmit and receive only UL/DL control signals. In this case, operation 1107 or 1109 may be optionally performed.

Figure 12:
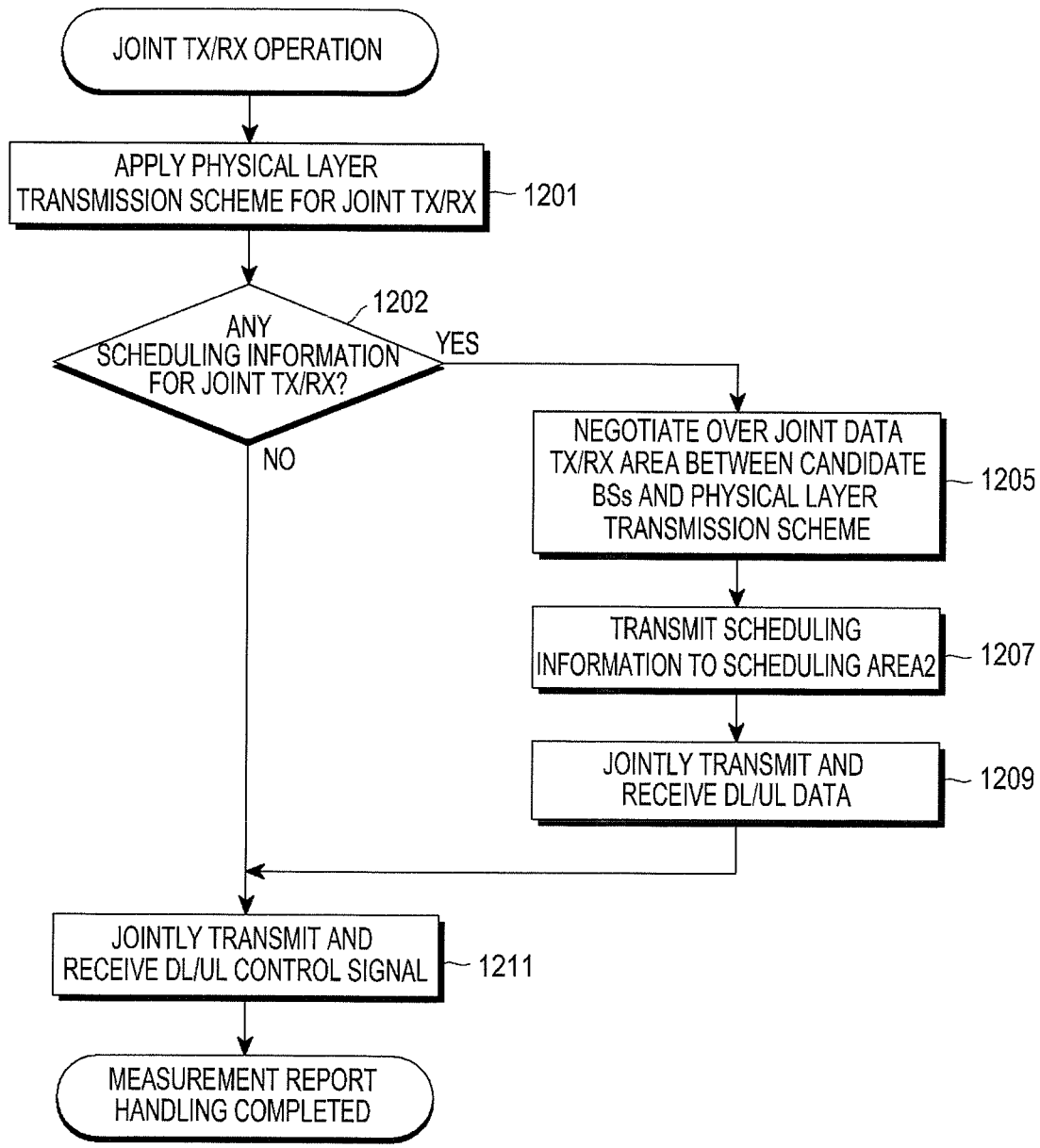
FIG. 12 illustrates a BS's operation for joint transmission/reception according to an embodiment of this disclosure.

FIG. 12 is a flowchart illustrating a BS's operation for joint transmission/reception according to an embodiment of the present disclosure, in which the BS refers to a serving BS for a MS.

Referring to FIG. 12, in operation 1201, the BS, which has determined joint transmission/reception, applies the physical layer transmission scheme for joint transmission/reception, which is set through the process of FIG. 10. The physical layer transmission scheme may include, for example, the CP length, Tx/Rx beam width, Tx power control information and the like. Thereafter, the BS determines in operation 1202 whether there is a need for scheduling of the data it will transmit and receive by the joint transmission/reception scheme. If there is a need for scheduling of the data it will jointly transmit and receive, the BS negotiates, in operation 1205, over the resource areas to be used for joint data transmission/reception and the detailed physical layer transmission scheme, with the candidate BSs, which are determined through the process of FIG. 10. Thereafter, in operation 1207, the BS transmits, to the MS, the joint transmission/reception-related scheduling information, which is determined in operation 1205, in the second scheduling areas in the frame of FIG. 8. Operation 1205 or some of that operation may be performed together in operations 1007 and 1009 of FIG. 10. In this case, operation 1205 or some of that operation may be omitted. The joint transmission/reception-related scheduling, information may be transmitted to the MS even via the candidate BS that is determined through the process of FIG. 10.

Thereafter, in operation 1209, the BS actually performs an operation of jointly transmitting and receiving DL/UL data with the determined candidate BS depending on the joint transmission/reception-related scheduling information. In operation 1211, the BS performs an operation of jointly transmitting and receiving DL/UL control signals related to data transmission/reception in the resource areas which are set through the process of FIG. 10, and then, ends the joint transmission/reception-related operation. In an alternative embodiment, the BS may jointly transmit and receive only DL/UL data, or may jointly transmit and receive only DL/UL control signal. In this case, operations 1202 to 1209 or operation 1211 may be optionally performed.

Figure 13:
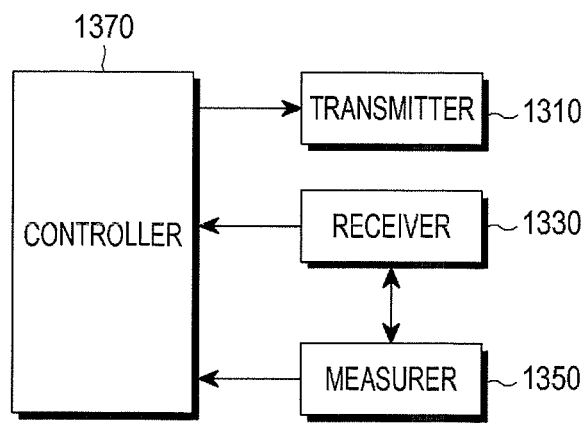
FIG. 13 illustrates a structure of a MS according to an embodiment of this disclosure.

FIG. 13 is a block diagram illustrating a structure of a MS according to an embodiment of the present disclosure.

Referring to FIG. 13, the MS includes a transmitter 1310 for transmitting a signal to at least one BS over the wireless network; a receiver 1330 for receiving a signal transmitted from the at least one BS over the wireless network; a measurer 1350 for measuring a reference signal received from the at least one BS; and a controller 1370 for determining a candidate BS for joint transmission/reception by receiving reference signals from nearby BSs according to an embodiment of the present disclosure, which have been described with reference to FIGS. 4 to 12, and controlling operations of the transmitter 1310 and the receiver 1330 to transmit and receive signals to/from at least one BS by the single-point transmission/reception scheme or the joint transmission/reception scheme. The specific operation of the MS having the structure of FIG. 13 is the same as described in conjunction with FIGS. 9 and 11, so a detailed description thereof will be omitted.

Figure 14:
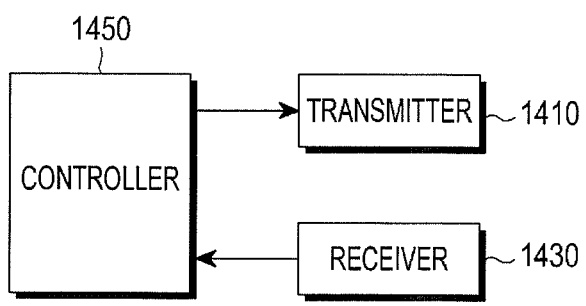
FIG. 14 illustrates a structure of a BS according to an embodiment of this disclosure.

FIG. 14 is a block diagram illustrating a structure of a BS according to an embodiment of the present disclosure.

Referring to FIG. 14, the BS includes a transmitter 1410 for transmitting a signal to a MS over the wireless network and transmitting a signal to at least one nearby BS over the wired/wireless network; a receiver 1430 for receiving a signal transmitted from the MS over the wireless network and receiving a signal transmitted from the at least one nearby BS over the wired/wireless network; and a controller 1450 for negotiating with a nearby BS to determine a candidate BS, by receiving candidate BS information for joint transmission/reception from the MS according to an embodiment of the present disclosure, which has been described with reference to FIGS. 4 to 12, and controlling operations of the transmitter 1410 and the receiver 1430 to transmit and receive signals by the single-point transmission/reception scheme or the joint transmission/reception scheme. The specific operation of the BS having the structure of FIG. 14 is the same as described in conjunction with FIGS. 10 and 12, so a detailed description thereof will be omitted.

As is apparent from the foregoing description, the proposed joint transmission/reception method by a plurality of BSs may stably maintain a communication link between a MS and the plurality of BSs in a mobile communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method performed by a mobile station (MS) having a plurality of reception beams in a wireless communication system including a plurality of base stations (BSs), the method comprising:
   receiving, from the plurality of BSs, a plurality of reference signals using a reception beam of the plurality of reception beams;
   determining, in the MS, that at least one BS of plurality of BSs is a candidate BS for cooperating with a serving BS for transmission or reception based on the plurality of reference signals;
   transmitting information on the determined candidate BS to the serving BS;
   receive resource allocation information from the serving BS; and
   transmitting or receiving a signal with the serving BS and the determine candidate BS based on the resource allocation information.

2. The communication method of claim 1, comprising after receiving the plurality of reference signals, measuring a signal strength of each of the plurality of reference signals.

3. The communication method of claim 1, wherein the candidate BS is determined based on:
   whether the reception beam through which at least one reference signal is received is identical to a reception beam through which a reference signal of the serving BS is received,
   a reception delay of the at least one reference signal, and
   an expected combining gain of a transmitted or received signal.

4. The communication method of claim 1, wherein the candidate BS is determined based on:
   whether the reception beam through which at least two reference signals are received from the BSs is not identical to a reception beam through which a reference signal of the serving BS is received,
   a reception delay of each of the at least two reference signals, and
   an expected combining gain of a transmitted or received signal.

5. The communication method of claim 1, wherein the candidate BS is determined based on:
   a beam width of a reception beam through which at least two reference signals are received from the plurality of BSs,
   a reception delay of each of the at least two reference signals, and
   an expected combining gain of a transmitted or received signal.

6. The communication method of claim 1, wherein scheduling information for the transmission or reception is provided in a specific scheduling area of a transmission frame.

7. The communication method of claim 1, wherein the transmitted or received signal includes at least one of: downlink data, uplink data, a downlink control signal, and an uplink control signal.

8. A mobile station (MS) having a plurality of reception beams to perform communication in a wireless communication system including a plurality of base stations (BSs), the MS comprising:
  a transceiver configured to:
    receive, from the plurality of BSs, a plurality of reference signals using a reception beam of the plurality of reception beams; and
    receive resource allocation information from a serving BS; and
  a controller configured to:
    determine at least one BS of the plurality of BSs is a candidate BS for cooperating with the serving BS for transmission or reception based on the plurality of reference signals;
    control the transceiver to transmit information on the determined candidate BS to the serving BS; and
    transmit or receive with the serving BS and the determined candidate BS based on the resource allocation information.

9. The MS of claim 8, further comprising a measurer configured to:
  measure a signal strength of each of the plurality of reference signals, and
  transfer the measured signal strength to the controller.

10. The MS of claim 8, wherein the candidate BS is determined based on:
  whether the reception beam through which at least one reference signal is received is identical to a reception beam through which a reference signal of the serving BS is received,
  a reception delay of the at least one reference signal, and
  an expected combining gain of a transmitted or received signal.

11. The MS of claim 8, wherein the candidate BS is determined based on:
  whether the reception beam through which at least two reference signals are received from the BSs is not identical to a reception beam through which a reference signal of the serving BS is received,
  a reception delay of each of the at least two reference signals, and
  an expected combining gain of a transmitted or received signal.

12. The MS of claim 8, wherein the candidate BS is determined based on:
  a beam width of a reception beam through which at least two reference signals are received from the plurality of BSs,
  a reception delay of each of the at least two reference signals, and
  an expected combining gain of a transmitted or received signal.

13. The MS of claim 8, wherein scheduling information for the transmission or reception is provided in a specific scheduling area of a transmission frame.

14. The MS of claim 8, wherein the transmitted or received signal includes at least one of downlink data, uplink data, a downlink control signal, or an uplink control signal.

15. A communication method by a base station (BS) in a mobile communication system using beamforming, the method comprising:
  receiving, from a mobile station (MS) having a plurality of reception beams, information about at least one candidate BS for cooperating with the BS for transmission or reception, wherein the at least one candidate BS is determined based on a plurality of reference signals using a reception beams of the plurality of reception beams by the MS;
  determining at least one cooperative BS among the at least one candidate BS;
  allocating resources to the MS by communicating with the determined at least one cooperative BS;
  transmitting resource allocation information to the MS; and
  transmitting or receiving a signal with the determined at least one cooperative BS based on the resource allocation information.

16. The communication method of claim 15, wherein the at least one candidate BS is determined based on:
  whether the reception beam through which at least one reference signal is received is identical to a reception beam through which a reference signal of the BS is received,
  a reception delay of the at least one reference signal, and
  an expected combining gain of a transmitted or received signal.

17. The communication method of claim 15, wherein the at least one candidate BS is determined based on:
  whether the reception beam through which at least two reference signals are received from the BSs is not identical to a reception beam through which a reference signal of the BS is received,
  a reception delay of each of the at least two reference signals, or
  an expected combining gain of a transmitted or received signal.

18. The communication method of claim 15, wherein the at least one candidate BS is determined based on:
  a beam width of the reception beam through which at least two reference signals are received from the plurality of BSs,
  a reception delay of each of the at least one reference signals, and
  an expected combining gain of a transmitted or received signal.

19. The communication method of claim 15, further comprising:
  Transmitting or receiving the signal using scheduling information for the transmission or reception provided in a specific scheduling area of a transmission frame.

20. The communication method of claim 15, wherein the jointly transmitted or received signal includes at least one of downlink data, uplink data, a downlink control signal, or an uplink control signal.

21. A base station (BS) to perform communication in a mobile communication system using beamforming, the BS comprising:
  a controller configured to:
    receive, from a mobile station (MS), having a plurality of reception beams, information about at least one candidate BS for cooperating with the BS for transmission or reception, wherein the at least one candidate is determined based on a plurality of reference signals using a reception beam of the plurality of reception beams by the MS,
    determine at least one cooperative BS among the at least one candidates BS, allocate resource to the MS by communicating with the determined at least one cooperative BS, transmit resource allocation information to the MS, and transmit or receive with the determined at least one cooperative BS based on the resource allocation information.

22. The BS of claim 21, wherein the at least one candidate BS is determined based on:

whether reception beam through which at least one reference signal is received is identical to a reception beam through which a reference signal of the BS is received, a reception delay of the at least one reference signal, and an expected combining gain of a transmitted or received signal.

23. The BS of claim 21, wherein the at least one candidate BS is determined based on:

whether the reception beam through which at least two reference signals are received from the BSs is not identical to a reception beam through which a reference signal of the BS is received, a reception delay of each of the at least two reference signals, and an expected combining gain of a transmitted or received signal.

24. The BS of claim 21, wherein the at least one candidate BS is determined based on:

a beam width of the reception beam through which at least two reference signals are received from the BSs, a reception delay of each of the at least two reference signals, and an expected combining gain of a transmitted or received signal.

25. The BS of claim 21, wherein the controller is configured to transmit or receive the signal using scheduling information for the transmission or reception is provided in a specific scheduling area of a transmission frame.

26. The BS of claim 21, wherein transmitted or received signal includes at least one of downlink data, uplink data, a downlink control signal, or an uplink control signal.

* * * * *